Aug. 3, 1954   K. C. BUGG   2,685,427
VALVE AND VALVE SEAL THEREFOR
Filed Jan. 26, 1949
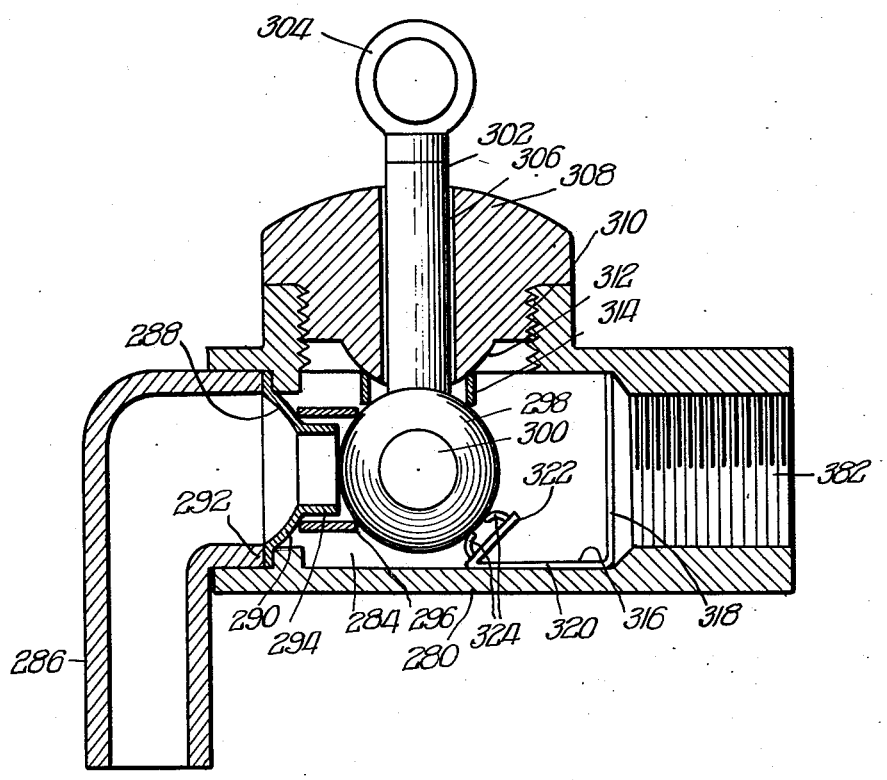
INVENTOR.
*Kerdy C. Bugg,*
BY Patented Aug. 3, 1954

2,685,427

UNITED STATES PATENT OFFICE 2,685,427

VALVE AND VALVE SEAL THEREFOR

Kenly C. Bugg, Fort Wayne, Ind., assignor to Kendick Manufacturing Company, Inc., Fort Wayne, Ind., a corporation of Indiana Application January 26, 1949, Serial No. 72,787

2 Claims. (Cl. 251—181)

This invention pertains to closure mechanism and, more particularly, to valve mechanism and valve sealing means.

In valve mechanism it is usual to have a fixed seat member and a poppet or movable member which is adapted to seat thereon, or control the flow therethrough, and in the case of valves wherein external operating means is provided, it is necessary to provide a valve seal, gland, or stuffing box to prevent leakage from the valve casing. The valve mechanism must be fitted tightly together when in seated position to prevent leakage therethrough, so that in many instances expensive machining operations must be used, particularly as where the parts have a metal to metal contact, or plastic inserts must be used. Due to the nature of such inserts, after a reasonably short use they must be replaced, and in valves where metal to metal contacts are used, the mating parts may become distorted, due to high pressures or temperatures, or fluctuation thereof, which causes leakage and objectionable wire drawing. It has been very difficult to provide proper seals or stuffing boxes, particularly where searching or abrasive fluids are handled, or where high pressures are being used.

It is, therefore, an object of this invention to provide a device wherein there is utilized an inexpensive, yet positive acting, packless seal.

Another object of the invention is to provide a packless rotary seal wherein members may be operated therethrough without deterioration of the seal.

Another object of the invention is to provide a valve mechanism and packless seal which can be economically manufactured and maintained with any desirable material and wherein the seal is provided with a flexible sealing member which can be rotated through a wide cleaning and wiping path to guard against undesirable deposits or choking.

Another object of the invention is to provide a valve or seal wherein means is utilized which prevents galling or seizing. For example, if a seal or valve is used wherein there are relatively fixed and rotatable spherical seats and a heavy, thick, substantially rigid cylindrical seal is interposed between the spherical seats, it has been found that galling takes places between the cylindrical sleeve and spherical seats, particularly where abrasive materials (such as gasoline) are passed through at high speeds and pressures, but it has been found that if a relatively thin, flexible tube (cylindrical seal) of proper length is used, when such tube tends to gall, it jumps to a new position so that galling is prevented and a perfect seal is formed and at the same time the seats are wiped clean.

Another object of the invention is to provide a rotary seal that is so constructed and arranged that, in effect, there is provided multiple universal seals with regard to alignment of parts, so that in manufacture it is not necessary that the parts be matched or mated exactly.

Another object of the invention is to provide a packless seal, or valve, wherein if deformation is caused for any reason, such as by heat, cold, physical deformation (pressure), such deformation does not affect the effectiveness of the valve or seal.

Another object of the invention is to provide a seal or valve construction wherein multiple sealing means may be used for the best conditions of adaptations for each sealing or seating problem.

Another object of the invention is to provide a rotary or other seal for a valve which may be used in component relation to a valve or rotary valve for fluid handling.

Another object of the invention is to provide a rotary seal and valve construction which is adapted for use in a rotary valve, wherein the usual close tolerances and precision manufacturing are not necessary.

Another object of the invention is to provide a rotary seal and rotary valve construction wherein the sealing means of the seal and valve is enhanced in its operation by flexible resilient means interposed between the seal and valve, or disposed in the seal and valve.

Another object of the invention is to provide a relatively frictionless rotary seal of the packless type, and to provide a rotary valve wherein a high compression spring or other resilient means, positions the sealing means of the seal and valve, and wherein means is provided so that the valve cannot distort or displace the sealing means.

Another object of the invention is to provide a rotary valve seal and rotary valve wherein the sealing means of each is universally joined to allow free movement in substantially any direction for proper sealing.

Another object of the invention is to provide a seal and valve that may be fabricated in any manner, such as by die casting, stamping, forging, machining, etc.

Another object of the invention is to provide a valve and seal construction wherein the parts can be readily replaced without taking down the whole valve, or other associated construction.

Another object of the invention is to provide a rotary seal and valve wherein volatile fluids, or those of any viscosity may be easily handled or sealed, and wherein fluids may be handled which are abrasive or corrosive, or wherein solids or other extraneous material are entrained.

Another object of the invention is to provide a rotary seal and valve construction wherein the parts can be so constructed and arranged that there is a relative wiping action either continuously or under periodic conditions of seizure.

Another object of the invention is to provide a rotary seal or valve construction wherein an operating sealing path may be provided between certain of the parts which is of an oscillating character of either large or small area, the extent of the area being selected for the handling of particular fluids.

Another object of the invention is to provide a valve and seal construction wherein the valve acts as a valve and seal.

With these and various other objects in view, the invention consists of certain novel features of construction and operation as will be more fully described and particularly pointed out in the specification, drawings and claims appended hereto.

The single figure of the drawing illustrates a preferred embodiment of the invention.

The sealing means of the valve construction shown comprises the flexible, resilient sleeves 296 and 314 which seal the stem opening and fluid discharge openings respectively. These sleeves may be made of any desired material, preferably the same as that of the associated valve parts, or of a material which is substantially inert with respect to the material handled and with the associated material of the valve. The sleeves are springy, resilient and flexible, and not ductile or malleable. In the drawing the sleeves are actually shown as of exaggerated thickness, it being understood that they are of the necessary thinness and length, and have the other characteristics necessary to fulfill their proper function. The length of a sleeve is such as to permit the sleeve to accommodate itself to the shape of the spherical seats. They are strong enough to withstand the compressive forces between the fixed and movable seats and the delivered fluid; they need not be exactly cylindrical, because the contact is over the spherical surface of the seats, and consequently is always circular; and are of sufficient diameter so that at the point of contact between the edges of the sleeve and spherical surfaces, the tangent thereto is preferably at an angle of 45° to the axis of the seat members.

As an example of the material which may be used, in the case of sleeves 296 and 314, they may be of 18-8 stainless steel tubing or sleeve 314 may be of high copper brass tubing. Other materials may be used, of course, as desired. With the example of materials given above, the seats 294 and 312 and the rotatable valve member 298 may be of 18-8 stainless steel; body cap 308 may be of high copper brass; and the body 280 may be of high copper brass or Plexiglas.

In the specific form of construction shown, the body 280 is provided with the threaded inlet 282 communicating with the valve chamber 284, the valve chamber 284 communicating with outlet of fitting 286 through seat member 288. Seat member 288 is provided with the segmentally spherical surface 290 terminating in an outwardly directed flange 292 which serves as securing means for the seat being disposed between the outlet fitting and the body. The seat preferably terminates in chamber 284 in a substantially cylindrical projecting portion 294 acting as positioning means for the flexible, resilient sleeve 296. Said sleeve cooperates with the spherical surface 290 of the fixed seat and with a spherical surface on the valve member 298.

Valve member 298 is provided with the passage 300 adapted to be rotated to control the communication between inlet 282 and outlet 286. Rotation of the valve is effected through the valve stem 302 provided with the handle 304, the valve stem being journalled as at 306 through body cap 308, said cap being secured as at 310 to the body member. The cap is provided with a segmentally spherical seat 312, and a flexible, resilient sleeve 314 is interposed between the seat 312 and the spherical seat on the valve member 298. A spring clip 316 is provided with a transverse, relatively narrow leg 318 extending across the passage 284, said leg being integral with leg 320 extending along the chamber 284, leg 320 being flanged as at 322 and cut out to provide spring fingers 324 adapted to engage the valve member 298 to urge it toward seats 290 and 312 whereby tight sealing means is provided through sleeves 296 and 314.

In the construction shown in the drawing the valve body 326 is provided with the inlet 328 communicating with the valve chamber 330, said chamber communicating with an outlet 332. A tubular member (pipe) 334 extends into the outlet and is provided with the segmentally spherical surface 336 terminating in the cylindrical positioning flange 338. Sleeve 340 of flexible resilient material is interposed between the spherical surface 336 and the spherical surface of rotatable valve member 340, said valve member being provided with a suitable passage 342 adapted to form connecting means between inlet and outlet.

While certain passages in the specific construction shown have been designated as inlets and outlets, it is understood these may be reversed or used in other combinations and it is to be understood that this application is not to be limited by the exact embodiment of the device shown, which is merely by way of illustration and not limitation as various and other forms of the device will, of course, be apparent to those skilled in the art without departing from the spirit of the invention or the scope of the claims.

I claim:

1. In a valve assembly, the combination of a casing having an inlet and an outlet and a valve chamber therebetween, a closure secured to said casing closing said chamber, a seat member adjacent said outlet having a segmentally spherical seat portion in said chamber terminating in a substantially cylindrical portion, a rotatable valve disposed in said chamber having a stem journalled loosely in said closure, said valve having seat portions of substantially spherical shape, said closure having a segmentally spherical seat portion in said chamber, a ring member disposed between one of said valve seat portions and said first named seat portion embracing said cylindrical portion, a ring member disposed between another of said valve seat portions and said seat portion of said closure, and a spring clip between said casing and valve member for urging said valve member to a position to cause tight engagement between said ring member and the engaged seat portions, said clip comprising a leg disposed across said inlet, a leg extending toward said valve member, and a flange provided on said last named leg extending toward said first named leg and having spring fingers engaging said valve member, said valve member having a passage therethrough adapted to control the connection between said inlet and outlet.

2. In a valve assembly, the combination of a casing having an inlet and an outlet and a valve chamber therebetween, a closure secured to said casing closing said chamber, a seat member having a segmentally spherical seat portion in said chamber, a movable valve disposed in said chamber having a stem journalled in said closure, said valve having seat portions of substantially spherical shape, said closure having a segmentally spherical seat portion in said chamber, a ring member disposed between one of said valve seat portions and said first named seat portion, a ring member disposed between another of said valve seat portions and said seat portion of said closure, and a spring clip between said casing and valve member for urging said valve member to a position to cause tight engagement between said ring members and the engaged seat portions, movement of said valve member controlling the connection between said inlet and outlet.

References Cited in the file of this patent

UNITED STATES PATENTS

| Number | Name | Date |
|---|---|---|
| 395,671 | Thayer | Jan. 1, 1889 |
| 518,927 | Rothchild | Apr. 24, 1894 |
| 934,614 | Huxley | Sept. 21, 1909 |
| 982,815 | Hobbs | Jan. 31, 1911 |
| 1,061,657 | Bondy | May 13, 1913 |
| 1,665,810 | Gillick | Apr. 10, 1928 |
| 1,670,691 | Riggin | May 22, 1928 |
| 1,740,682 | Carrey | Dec. 24, 1929 |
| 1,805,668 | Kelley | May 19, 1931 |
| 2,110,098 | Strecker | Mar. 1, 1938 |
| 2,173,949 | Neveu | Sept. 26, 1939 |
| 2,226,169 | Koehler | Dec. 24, 1940 |
| 2,479,554 | Bugg | Aug. 23, 1949 |
| 2,504,863 | Monroe et al. | Apr. 18, 1950 |
| 2,520,288 | Shand | Aug. 29, 1950 |

FOREIGN PATENTS

| Number | Country | Date |
|---|---|---|
| 608,847 | France | Aug. 3, 1926 |
| 91,153 | Sweden | Dec. 28, 1937 |